United States Patent
Gögler et al.

(10) Patent No.: US 11,774,739 B2
(45) Date of Patent: Oct. 3, 2023

(54) METHOD FOR CONTROLLING OR REGULATING A MICROSCOPE ILLUMINATION

(71) Applicant: Carl Zeiss Microscopy GmbH, Jena (DE)

(72) Inventors: Michael Gögler, Wolfratshausen (DE); Thomas Ohrt, Golmsdorf (DE)

(73) Assignee: Carl Zeiss Microscopy GmbH, Jena (DE)

( * ) Notice: Subject to any disclaimer, the term of this patent is extended or adjusted under 35 U.S.C. 154(b) by 814 days.

(21) Appl. No.: 16/463,017

(22) PCT Filed: Nov. 22, 2017

(86) PCT No.: PCT/EP2017/080132
§ 371 (c)(1),
(2) Date: May 22, 2019

(87) PCT Pub. No.: WO2018/096004
PCT Pub. Date: May 31, 2018

(65) Prior Publication Data
US 2019/0278071 A1    Sep. 12, 2019

(30) Foreign Application Priority Data
Nov. 22, 2016    (DE) ............. 10 2016 122 528.2

(51) Int. Cl.
*G02B 21/06*    (2006.01)
*G02B 21/00*    (2006.01)
(Continued)

(52) U.S. Cl.
CPC ......... *G02B 21/06* (2013.01); *G02B 21/0096* (2013.01); *G02B 21/16* (2013.01); *G02B 21/365* (2013.01)

(58) Field of Classification Search
CPC .. G02B 21/06; G02B 21/0096; G02B 21/002; G02B 21/0076; G02B 21/0032;
(Continued)

(56) References Cited

U.S. PATENT DOCUMENTS 4,595,829 A    6/1986 Neümann et al.
5,162,641 A    11/1992 Fountain
(Continued)

FOREIGN PATENT DOCUMENTS

CN    1067573 A    1/1993
CN    1249810    4/2000
(Continued)

OTHER PUBLICATIONS

PCT International Preliminary Report on Patentability for International Application No. PCT/EP2017/080132, dated Jun. 6, 2019, 9 pages.
(Continued)

*Primary Examiner* — Balram T Parbadia
*Assistant Examiner* — Rahman Abdur
(74) *Attorney, Agent, or Firm* — DeWitt LLP

(57) ABSTRACT

A method for regulating a light source of a microscope that illuminates an object, said method including specifying an intended value of an energy parameter of illumination radiation on the object; producing illumination radiation; providing an objective for focusing illumination radiation onto the object; ascertaining a transmission property of the objective for the illumination radiation; output coupling a component of the illumination radiation upstream of the objective as measurement radiation and measuring an actual value of the energy parameter of the measurement radiation; providing a relationship between energy parameters of the measurement radiation and energy parameters of the illumination radiation on the object, and setting the light source in such a way that
(Continued)

the actual value of the energy parameter measured for the measurement radiation corresponds to the intended value of the energy parameter according to the relationship.

11 Claims, 5 Drawing Sheets

(51) Int. Cl.
  *G02B 21/16* (2006.01)
  *G02B 21/36* (2006.01)
(58) Field of Classification Search
  CPC .. G02B 21/0064; G02B 21/008; G02B 21/16; G02B 21/365; G02B 27/283; G01N 21/6458; G01N 21/64; G01N 21/474; G03F 7/20; G03F 7/702; G03F 7/7085; G03F 7/70258; G03F 7/70141; G01B 11/24; G01B 11/14
  USPC .......................................................... 359/385
  See application file for complete search history.

(56) References Cited

U.S. PATENT DOCUMENTS

| | | | |
|---|---|---|---|
| 5,760,901 A | 6/1998 | Hill | |
| 7,199,360 B1 | 4/2007 | Montagu | |
| 7,289,265 B2 | 10/2007 | Koyama | |
| 7,907,271 B2 | 3/2011 | Christiansen et al. | |
| 8,027,030 B2 | 9/2011 | Christiansen et al. | |
| 8,120,768 B2 | 2/2012 | Christiansen et al. | |
| 8,314,931 B2 | 11/2012 | Christiansen et al. | |
| 8,427,635 B2 | 4/2013 | Christiansen et al. | |
| 8,619,252 B2 | 12/2013 | Nakasho | |
| 2002/0191177 A1 | 12/2002 | Ulrich et al. | |
| 2003/0184857 A1 | 10/2003 | Hay | |
| 2004/0149883 A1 | 8/2004 | Eda | |
| 2005/0035281 A1 | 2/2005 | Mehner et al. | |
| 2005/0275938 A1 | 12/2005 | Koyama | |
| 2006/0245053 A1 | 11/2006 | Sander | |
| 2007/0002437 A1 | 1/2007 | Spink et al. | |
| 2007/0081233 A1* | 4/2007 | Hattori | G02B 21/16 359/385 |
| 2007/0296959 A1 | 12/2007 | Schwotzer | |
| 2009/0059215 A1 | 3/2009 | Mehanian et al. | |
| 2010/0033811 A1 | 2/2010 | Westphal et al. | |
| 2010/0208339 A1 | 8/2010 | Kleppe et al. | |
| 2011/0017902 A1 | 1/2011 | Hing et al. | |
| 2011/0051232 A1 | 3/2011 | Steinbom | |
| 2011/0101203 A1 | 5/2011 | Cooper et al. | |
| 2011/0157350 A1 | 6/2011 | Yamamoto | |
| 2011/0309231 A1 | 12/2011 | Cooper et al. | |
| 2011/0310475 A1 | 12/2011 | Iijima | |
| 2011/0315851 A1 | 12/2011 | Kishima et al. | |
| 2012/0002034 A1 | 1/2012 | Matsunabu et al. | |
| 2012/0075456 A1 | 3/2012 | Seitz | |
| 2012/0086795 A1* | 4/2012 | Weiss | G02B 21/16 348/79 |
| 2012/0092669 A1 | 4/2012 | Fiolka et al. | |
| 2012/0133925 A1 | 5/2012 | Nakasho | |
| 2012/0314206 A1 | 12/2012 | Spizig et al. | |
| 2013/0170021 A1 | 7/2013 | Mukai et al. | |
| 2014/0047895 A1 | 2/2014 | Shih | |
| 2014/0063495 A1 | 3/2014 | Kimura | |
| 2014/0295535 A1 | 10/2014 | Kitahara et al. | |
| 2014/0374575 A1 | 12/2014 | Takesue et al. | |
| 2015/0054937 A1 | 2/2015 | Lippert et al. | |
| 2015/0205088 A1 | 7/2015 | Shih et al. | |
| 2015/0276483 A1 | 10/2015 | Mikami | |
| 2016/0048011 A1 | 2/2016 | Suzuki et al. | |
| 2016/0048967 A1 | 2/2016 | Mitzkus et al. | |
| 2016/0216504 A1 | 7/2016 | Hing et al. | |
| 2016/0320301 A1 | 11/2016 | Knebel et al. | |

FOREIGN PATENT DOCUMENTS

| | | | |
|---|---|---|---|
| CN | 1511248 | 7/2004 | |
| CN | 101115970 A | 1/2008 | |
| CN | 101401722 | 4/2009 | |
| CN | 101477306 A | 7/2009 | |
| CN | 102156976 A | 8/2011 | |
| CN | 102288588 A | 12/2011 | |
| CN | 102305776 A | 1/2012 | |
| CN | 102313982 A | 1/2012 | |
| CN | 102349017 | 2/2012 | |
| CN | 102439419 | 5/2012 | |
| CN | 102597841 A | 7/2012 | |
| CN | 102959451 A | 3/2013 | |
| CN | 103674926 | 3/2014 | |
| CN | 104303089 | 1/2015 | |
| CN | 104317041 | 1/2015 | |
| CN | 104704349 A1 | 6/2015 | |
| CN | 104932092 A | 9/2015 | |
| CN | 105209956 A | 12/2015 | |
| CN | 105874317 A | 8/2016 | |
| CN | 105974317 A | 8/2016 | |
| CN | 205485003 | 8/2016 | |
| DE | 3219503 A1 | 12/1983 | |
| DE | 20205081 U1 | 6/2002 | |
| DE | 10157613 A1 | 10/2002 | |
| DE | 10142945 A1 | 4/2003 | |
| DE | 102004046375 A1 | 4/2006 | |
| DE | 102004046375 A1 * | 4/2006 | ........... G02B 21/086 |
| DE | 102007047187 A1 | 4/2009 | |
| DE | 102008034137 A1 | 4/2009 | |
| DE | 102008018864 A1 | 10/2009 | |
| DE | 102008018952 A1 | 10/2009 | |
| DE | 202010010932 U1 | 10/2011 | |
| DE | 102014216227 A1 | 2/2016 | |
| EP | 1260848 B1 | 11/2002 | |
| EP | 1353210 B1 | 10/2003 | |
| EP | 1496384 A2 | 1/2005 | |
| EP | 1605292 A1 | 12/2005 | |
| EP | 2458420 B1 | 5/2012 | |
| EP | 2784565 A1 | 10/2014 | |
| EP | 2818905 A2 | 12/2014 | |
| JP | H11-174332 A | 7/1999 | |
| JP | 2003029130 A | 1/2003 | |
| JP | 2004-177733 A | 6/2004 | |
| JP | 2005-091701 A1 | 4/2005 | |
| JP | 2010014965 A | 1/2010 | |
| JP | 2013-174848 A | 9/2013 | |
| JP | 2015-041007 A | 3/2015 | |
| WO | WO 2007/144197 A1 | 12/2007 | |

OTHER PUBLICATIONS

English translation of PCT International Preliminary Report on Patentability for International Application No. PCT/EP2017/080132, dated Jun. 6, 2019, 8 pages.
Chinese Search Results, 2 pages, Dec. 25, 2020.
Chinese Search Results, 2 pages, Feb. 2, 2021.
International Search Report for International Application No. PCT/EP2017/080132, dated Mar. 13, 2019; 4 pages.
English translation of International Search Report for International Application No. PCT/EP2017/080132, dated Mar. 13, 2018; 3 pages.
Grünwald et al.: "Calibrating excitation light fluxes for quantitative light microscopy in cell biology", Nat Protoc. 2008, 3 (11).
Olympus: Research Inverted Microscope—IX3 Series, Mar. 2014.
Thorlabs: Microscope Slide Silicon Power Head—S170C, Jul. 23, 2013.
Young et al.: "Photonic Calibration for Fluorescence Microscopy", SPTE, vol. 6859, 685915 (2008).

* cited by examiner ness of the transmission property of the objective, the value of the energy parameter of the illumination radiation on the object can be determined more accurately from the actual value of the energy parameter of the measurement radiation. As a result, it is also possible for the illumination radiation on the object to be set precisely with regard to the energy parameter.

METHOD FOR CONTROLLING OR REGULATING A MICROSCOPE ILLUMINATION

RELATED APPLICATIONS

This application is a National Phase entry of PCT Application No. PCT/EP2017/080132 filed Nov. 22, 2017, which application claims the benefit of priority to German Application No. 102016122528.2, filed Nov. 22, 2016, the entire disclosures of which are incorporated herein by reference.

FIELD OF THE INVENTION

The invention relates to a method for controlling or regulating a light source of a microscope, said light source illuminating an object.

BACKGROUND

In the case of microscopes, laser-based methods, such as laser scanning microscopy, and optical manipulation techniques, e.g. optical tweezers, it is often desirable to be able to accurately set the intensity of the illumination radiation. This supports the reproducibility of measurements. It is known to determine the intensity of the light source by arranging a radiation detector instead of the sample and, in this way, determining the intensity of the illumination radiation that is to be expected at the object. Such methods are disclosed for example in EP 2458420 B1 or U.S. Pat. No. 8,619,252 B2. Since this measurement of the intensity can only be carried out after or before the measurement in the sample, EP 1260848 B1 or EP 1353210 B1 proposes providing an intensity detector in the illumination beam path near the light source. In this way, the intensity of the illumination radiation emitted by the light source can also be determined during the measurement of the object.

SUMMARY

The problem addressed by the invention is that of providing a method for controlling a microscope illumination that illuminates an object, by means of which method an energy parameter of the illumination radiation on the object can be set particularly precisely.

The invention is defined in claim 1. Preferred embodiments are the subject matter of the dependent claims.

The invention provides a method for controlling or regulating a light source of a microscope for illuminating an object with illumination radiation, which method comprises the following steps: defining a setpoint value of an energy parameter of the illumination radiation on the object, generating the illumination radiation by means of the light source, providing an objective for focusing the illumination radiation onto the object, coupling out a proportion of the illumination radiation, in particular upstream of the objective as measurement radiation, and measuring an actual value of the energy parameter of the measurement radiation, ascertaining a transmission property of the objective for the illumination radiation, providing a relationship between energy parameter of the measurement radiation and energy parameter of the illumination radiation on the object, wherein the relationship is dependent on the magnitude of the proportion and the transmission property of the objective, and setting the light source in such a way that the actual value of the energy parameter measured for the measurement radiation corresponds, within a tolerance range, to the setpoint value of the energy parameter of the illumination radiation on the object in accordance with the relationship.

The relationship serves to determine, from the measured actual value of the energy parameter of the measurement radiation, the associated instantaneous value of the energy parameter on the object. The use of the relationship is thus a step of converting measurement radiation to the illumination of the object. The inverse conversion is optionally possible since the relationship in general is mathematically invertible (with the use of an equation) or corresponding inverse tables can easily be created.

The energy parameter can be the intensity or the power or fluence.

Since the proportion of the illumination radiation that is actually transmitted by the objective is known as a result of ascertaining the transmission property of the objective, the value of the energy parameter of the illumination radiation on the object can be determined more accurately from the actual value of the energy parameter of the measurement radiation. As a result, it is also possible for the illumination radiation on the object to be set precisely with regard to the energy parameter.

The method can be carried out both for fluorescence microscopy and for laser-based techniques, in particular in the wide field. Furthermore, it is possible to employ the method in the case of illumination radiation that effects optical manipulation techniques, such as FRAP (Fluorescence Recovery after Photobleaching) or FLIP (Fluorescence Loss in Photobleaching) or Laser Ablation. Moreover, the method can be carried out at various wavelengths and simultaneously for experiment. This reduces the user interaction, as a result of which experiments are simplified and become more reproducible. The measurement data obtained can be linked with the recorded images.

The method can be carried out for example with the aid of a control device assigned to the microscope. By way of example, the control device can be embodied as a microprocessor, an electric circuit, a computer or any other programmable apparatus. The object can be any sample or body which is intended to be imaged or manipulated by means of the microscope. In particular, the microscope can also be used as optical tweezers that are intended to be used to fix the object.

Insofar as the microscope is a reflected light microscope, the illumination radiation passing counter to the imaging radiation is coupled into the imaging beam path and then guided via the objective into the object (usually a sample). Between this input coupling location and the object, the imaging beam path thus contains the illumination beam path. There the illumination radiation passes toward the object and the imaging radiation passes away from the object. This section is usually also referred to as joint beam path. This terminology is also used in the description below.

The light source can comprise a laser, a white light source, such as a halogen or mercury lamp, for example, or a light-emitting diode (LED) or a combination thereof. In particular, the light source can generate illumination radiation in one wavelength range or illumination radiation having individual discrete wavelengths or wavelength ranges; preferably, the light source comprises a plurality of individual light sources that respectively generate radiation in different, e.g. discrete, wavelength ranges. Preferably, the light source is connected to the control device, which controls the intensity or the power of the illumination radiation. The light source can provide parallelized illumination radiation or there is disposed in front of the light source a lens or lens system, for example a microlens array, by mean of which the radiation provided by the light source can be parallelized. Alternatively, the illumination radiation can be guided in a non-parallelized fashion in the illumination beam path. The fact of whether the illumination radiation passes in a parallelized fashion depends not least on the imaging method carried out by the microscope. In the case of laser scanning microscopes and in the case of optical manipulation techniques, in general the illumination radiation will pass in a parallelized fashion; in the case of wide field imagines or TIRF (Total Internal Reflection Fluorescence) experiments, by contrast, the illumination radiation usually passes convergently through the illumination beam path.

The monitoring device determines the energy parameter of the radiation incident on it, e.g. the intensity or the power of the measurement radiation. The monitoring device can be configured as a photodetector, CCD sensor or the like and is designed, in particular, to detect radiation in a wavelength range of 355 nm to 700 nm; it furthermore has for example a dynamic range of $10^5$. Preferably, the monitoring device is connected to the control device, such that the monitoring device provides for the control device a signal corresponding to the energy parameter of the measurement radiation which impinges on the monitoring device. The value of the energy parameter of the measurement radiation that is determined by the monitoring device is referred to here as actual value.

The beam splitter device can be embodied as a beam splitter having a predefined transmission and reflection behavior. Furthermore, it is possible for the beam splitter device to be a glass plate arranged in the imaging beam path. In particular, the beam splitter device is configured in such a way that that proportion of the illumination radiation which is coupled out onto the monitoring device is small in comparison with that proportion of the illumination radiation which passes further to the objective/object. By way of example, only 15%, 10%, 5% or 1% of the illumination radiation is coupled out as measurement radiation onto the monitoring device. The beam splitter device is preferably provided in a section of an illumination beam path which guides the illumination radiation from the light source into the object, in which section the illumination radiation passes in a parallelized fashion. The beam splitter device is thus arranged in an infinity space situated in the imaging beam path between the objective and a tube lens. The infinity space is the space between objective and tube lens.

In one step, preferably a first step of the method, the setpoint value of the energy parameter of the illumination radiation on the object is defined. This can be carried out for example before the beginning of an imaging of an object. The setpoint value indicates, in particular, with what intensity or power the object is intended to be illuminated. In this case, the setpoint value is preferably chosen such that no radiation damage occurs in the object and/or the setpoint value lies above a certain limit value that needs to be exceeded in order to image the object, for example with a predefined signal-to-noise ratio. However, the setpoint value can also be chosen in such a way that it corresponds to an imaging of the object that has already been carried out, such that the conditions of a previous experiment are reproduced. The setpoint value can be set for the entire region of the object that is illuminated with the illumination radiation, or for a specific segment from the illuminated region on the object. One example of this is that the setpoint value is defined in the region having the highest illumination intensity—e.g. in the case in which the illumination radiation has a location-dependent intensity profile.

The illumination radiation generated by means of the light source is focused onto the object via the objective. The focusing can be such that the illumination radiation is focused into the object in a diffraction-limited manner, e.g. in a point-type manner, as is customary for example in the case of confocal imagings. However, it is also possible for the object to be illuminated in a planar manner, inter alia in the case of wide field imagings.

Furthermore, the transmission properties of the objective are ascertained, for example what intensity proportion of the radiation incident on the objective is transmitted (transmittance), and what proportion is reflected and/or absorbed. This ascertaining of the transmission property can be carried out separately for each type of objective used. Furthermore, it is possible for the transmission property to be ascertained for each objective individually used. The ascertaining can be carried out for example by identifying the objective currently being used and reading out the transmission property from a database stored for example in a memory of the control device. Identifying the objective currently being used can also be carried out by manual input, wherein reading out the transmission property can also take place by way of online databases, external memories or the like. By way of example, if a plurality of objectives are arranged on a turret in the microscope, the instantaneous position of the turret can be read out, for example. Furthermore, it is possible for the objectives to be marked, for example with an RFID (radio-frequency identification) chip, which is read. Determining the transmission property of the objective can be carried out once, or the data are obtained from the manufacturer of the objective. Furthermore, it is possible for the transmission property of the objective to be ascertained in a separate step before carrying out the measurement or imaging of the object, for example by calibration in which the transmission property is determined in a known manner with the aid of an additional detector and an accurately set light source.

On account of the indications concerning the objective and concerning the beam splitting device, the value of the energy parameter of the illumination radiation that is present in the object can preferably be calculated from the detected value of the energy parameter of the measurement radiation. By way of example, the power LO present in the object, the measured power L, that proportion of the illumination radiation which is made up of the measurement radiation before the output coupling A and the transmittance of the objective T are related by the following equation:

$$LO = L \times T \times \left(\frac{1-A}{A}\right) \quad (1)$$

If the intention is to use the intensity instead of the power as energy parameter, the power is also divided by the area of the radiation on the monitoring device. The area may be known, or the monitoring device is spatially resolving and thus simultaneously allows an area measurement of the cross section of the measurement radiation.

The relationship is stored in particular in a memory of the control device. Preferably, if a table is used for the relationship, the values of the table are interpolated in order thus to provide a continuous relationship. The relationship indicates what value of the energy parameter on the object arises for a given value of the energy parameter of the measurement radiation.

In the illumination beam path, preferably no optical imaging elements which can alter the energy parameter of the illumination radiation such as is incident in the object are arranged in the region between beam splitter device and objective. In this regard, by way of example, no filters, lenses, stops, pinholes or optical units are provided in the imaging beam path between the beam splitter device and the objective. This is because optical imaging elements would have the effect that the energy parameter of the illumination radiation in the object would be altered and this alteration would not be detected by the monitoring device. Consequently, the monitoring device would not be able to directly detect the energy parameter of the illumination radiation that is present in the object. Preferably, the beam splitter device is arranged in the joint beam path directly adjacent to the objective. This excludes a shutter which blocks the illumination radiation in the closed state and is open during microscopy examination. After all, said shutter has no effect during microscopy examination.

The light source is set with regard to the energy parameter of the illumination radiation such that the actual value of the energy parameter of the measurement radiation—converted by means of the relationship—corresponds, within a tolerance range, to the previously defined setpoint value of the energy parameter. This can be carried out for example by the control device, which is connected to the light source, altering the intensity or power of the illumination radiation generated by the light source. The tolerance range can preferably likewise be set and is dependent for example on the accuracy of the desired setpoint value. The tolerance range is for example 10%, 5% or 1%.

The step of setting the energy parameter of the illumination radiation can be carried out once at the beginning of the experiment or continuously, in one variant in a regulation of the light source.

Setting the energy parameter of the illumination radiation can be carried out for example in such a way that a target value of the energy parameter of the measurement radiation is determined for the setpoint value of the energy parameter of the illumination radiation by way of the relationship and the actual value is regulated to the target value. Alternatively, by way of the relationship, an instantaneous value of the energy parameter of the illumination radiation on the object can be determined from the actual value of the energy parameter of the measurement radiation and the instantaneous value can be set in such a way that it corresponds, within the tolerance range, to the setpoint value. The relationship permits the regulated or reference variable and/or the manipulated variable to be chosen.

Preferably, the microscope furthermore has an interface for an autofocus device for determining the focus of the objective in the object, wherein the interface has an autofocus beam path for guiding autofocus radiation to the object. The beam splitter device has a dual function in that firstly, on the objective side, it couples autofocus radiation into and/or out of the joint beam path and secondly, on the light source side, it couples out the measurement radiation to the monitoring device. In one configuration, the reflected light microscope therefore has an autofocus device for determining the focus of the objective for the object. The autofocus device has an autofocus beam path for guiding autofocus radiation to the objective. The beam splitter device has a dual function in that firstly, on the objective side, it couples autofocus radiation into and/or out of the joint beam path and secondly, on the light source side, it couples out the measurement radiation to the monitoring device. In the case of known reflected light microscopes, there is a lack of space in the joint beam path for arranging all of the optical elements appropriately therein. Particularly in the section of the beam path between objective and tube lens, that is to say in the infinity space, there is little space in the case of conventional microscopes. As a result of the dual function of the beam splitter device, nevertheless both an autofocus device and the monitoring device can be displaced in the space-limited region and it is possible to provide both a monitoring device and an autofocus device despite scarcity of structural space. With regard to the objective, the light source, the optical element and/or the monitoring device, the considerations mentioned above are analogously applicable to this development. Furthermore, it is preferred for the joint beam path between the beam splitter device that couples out the measurement radiation and the objective to be free of optical imaging elements. The interface is embodied in such a way that the autofocus device can be connected thereto and at the same time the radiation relevant to the autofocus device can be guided through the interface. Of course, the autofocus device can comprise an optional interface for the monitoring device. Moreover, it is possible for the autofocus device to be a module comprising autofocus device and monitoring device. The interface is a thread, for example, and the autofocus beam path can comprise a cross section through which the autofocus radiation is guided. The autofocus device can be an element separate from the microscope and can be embodied as described in WO 2007/144197 A1, DE 102008018952 A1 or DE 102008018864 A1. The autofocus device has an autofocus light source, which serves for generating the autofocus radiation. The autofocus radiation is guided by means of the autofocus beam path via the beam splitter device to the objective and thus onto the object. The autofocus radiation is reflected or scattered by the object, collected by the objective and fed to an autofocus detector by means of the autofocus beam path via the beam splitter device. To that end, a beam splitter can be provided in the autofocus device, by means of which beam splitter the input coupling of the autofocus radiation generated by the autofocus light source and/or the output coupling of the autofocus radiation originating from the object to the autofocus detector are/is carried out. The autofocus illumination radiation generated by the autofocus light source and the autofocus measurement radiation guided to the autofocus detector are combined here under the term "autofocus radiation". They are jointly coupled in and out, respectively, via the beam splitter device. However, it is also possible to provide a further beam splitter in the imaging beam path, by means of which autofocus radiation is coupled into or out of the joint beam path. In this embodiment, it is thus possible for the autofocus light source and the autofocus detector to be arranged at different locations that are far apart in the microscope.

By way of example, an obliquely placed grating can be positioned in the autofocus beam path, which grating is imaged into the object, such that the backscattering at the object is monitored with the aid of the autofocus detector and the position of the focus is thus determined. In another embodiment, the autofocus light source can generate in the object a point-type light spot, the sharpness or extent of which is measured with the aid of the autofocus detector, and conclusions are thus drawn about the position of the focus. In particular, the autofocus device is connected to the control device, wherein the control device can set or subsequently correct on the basis of the values of the position of the focus ascertained by the autofocus device. Consequently, a drift in the position of the focus can be compensated for with the aid of the autofocus device. The autofocus radiation is preferably in a wavelength range that is not used for the imaging of the object. By way of example, the autofocus radiation is in the infrared wavelength range and the illumination radiation is in the visible wavelength range.

In order to increase the accuracy of setting the energy parameter of the illumination radiation on the object, it is preferred for the transmission property to be specified in a wavelength-dependent manner and/or for the actual value of the energy parameter of the measurement radiation to be measured in a wavelength-resolving manner and/or for the relationship to be specified in a wavelength-dependent manner. By way of example, the parameters mentioned are determined for a plurality of wavelengths or in one or more wavelength ranges. The transmission property of the objective and/or the actual value of the energy parameter can be different depending on wavelength. By way of example, the transmission properties of the objective are different in the visible wavelength range compared with the infrared wavelength range.

The monitoring device can have one or more detectors that detect radiation in a specific wavelength range. In order nevertheless to detect a plurality of wavelength ranges, a device for splitting the illumination beams according to wavelength ranges can be provided, such as a prism and/or a grating, for example. These are then disposed upstream of the detectors of the monitoring device in the illumination direction. Furthermore, it is possible for the monitoring device to comprise a spectrometer. The possibility of detecting a plurality of wavelength ranges and/or a plurality of wavelengths enables the actual value of the energy parameter of the measurement radiation to be determined more accurately. By way of example, if a plurality of light sources having different wavelength ranges are used, the individual light sources can thus be individually monitored and individually regulated. Since preferably both the transmission property of the objective and the relationship are wavelength-dependent, the energy parameter on the object can be determined more accurately. Furthermore, a plurality of detectors for specific wavelength ranges or wavelengths make the construction of the monitoring device simpler since elements of low complexity, such as photodiodes, for example, can be used for the individual detectors.

In order to further increase the accuracy of the relationship and thus the conversion and thus to improve the setting of the energy parameter in the object, in one development, it is preferred that for taking account of the transmission property of the objective for the relationship, the type of the light source and/or an excitation filter, which is positioned in the illumination radiation path, are/is ascertained. The wavelength range of the illumination radiation can be modified by means of an excitation filter, as bandpass filter having a transmission range of 510 nm to 550 nm. For ascertaining the excitation filter, the transmission spectrum can be input manually, for example. Furthermore, it is possible for the control device to detect the position of a turret on which a plurality of excitation filters are arranged. For ascertaining the property of the excitation filter, provision can be made for the control device to consult a database in which the transmission spectra of the transmission filters used are stored.

The type of the light source, in particular the emission spectrum thereof, is preferably ascertained by the control device, for example by virtue of which of the plurality of light sources is driven by the control device. Furthermore, it is possible also to manually input the type of the light source, in particular the emission spectrum thereof. If the light source is configured in a broadband fashion, it may be sufficient to monitor only one wavelength range or one specific wavelength in order to draw conclusions about the energy parameter over the entire wavelength range made available by the light source. This relation can be ascertained for example by calibration or from databases.

By means of the knowledge of the wavelength or the wavelengths of the illumination radiation and/or of the excitation filter used, what wavelength range is covered by the illumination radiation is thus known. If the relationship is simultaneously present in a wavelength-dependent manner, the energy parameter used to illuminate the object can be adapted with regard to the wavelength range of the illumination radiation.

In order furthermore to configure the monitoring device more simply, it is preferred that the energy parameter of the measurement radiation is measured in a predefined wavelength range of the illumination radiation, and the type of the light source and/or the excitation filter are/is ascertained, wherein the energy parameter on the object in the entire wavelength range is deduced from these indications. Moreover, for this purpose the transmission property of the objective can be detected in a wavelength-dependent manner. Ascertaining the type of the light source and/or the excitation filter can be carried out as described above. If the light source has a plurality of broadband light generating units, the predefined wavelength range can be chosen in such a way that it lies in all the broadband wavelength ranges made available. In this way, a relatively narrow wavelength range suffices for monitoring all the light generating devices, wherein the value of the energy parameter on the object is ascertained from the profiles of the energy parameters provided by the individual light generating devices. In order to avoid measurement errors, a bandpass filter can be provided between the beam splitting device and the monitoring device, said bandpass filter transmitting the wavelength ranges or wavelengths detected by the monitoring device. Crosstalk of radiations from other wavelength ranges can be avoided in this way.

If the settings of the components of the microscope, such as laser sources, excitation filters, objective, luminous field stop, etc., are input manually and thus detected, it is sufficient for the control device to effect a regulation of the actual value of the energy parameter of the measurement radiation. The construction of the microscope can thus be simplified since a connection of the control device to the individual components (apart from the light source) is not necessary. Sensors for determining the settings of the individual components are unnecessary in this embodiment.

In order to determine the energy parameter of the illumination radiation on the object even more precisely, it is preferred that the relationship furthermore takes account of optical elements arranged between the objective and the beam splitter device, at which the measurement radiation is separated from the illumination radiation, and/or an immersion medium present between the object and the objective.

The transmission properties can be detected analogously to the transmission properties of the objective. The transmission properties of the optical elements then indicate a further factor by which the energy parameter of the illumination radiation on the object is reduced. Taking account of the immersion medium between the object and the objective can be used to more accurately determine the area on the object that is illuminated by the microscope, since the immersion medium influences the focal length of the objective. The relationships necessary for this purpose are known from the prior art. The immersion medium is oil or water, for example.

In order that the energy parameter of the illumination radiation that is present on the object can be set even more precisely, it is preferred for a monitoring stop to be provided in the beam path of the measurement radiation. An opening cross section of the monitoring stop is set in such a way that the opening corresponds to an effective aperture of the objective. If the illumination radiation passes parallel upstream and/or downstream of the beam splitter device, by setting the opening of the monitoring stop it is possible to adapt the extent of the measurement radiation to the extent of the illumination radiation which passes through the objective. In this way, the actual value in the case of different objectives can be adapted more precisely to the setpoint value on the object. The opening of the monitoring stop can be altered with the aid of the control device, which controls a drive, for example. The aperture of the objective can be determined analogously to the transmission property of the objective used.

Furthermore, a luminous field stop can be provided, which has an opening, by means of which the extent of the illumination radiation in an object plane, which is a plane in the object that is imaged by the microscope, can be delimited. The luminous field stop is optionally arranged in a plane that is conjugate with respect to the object plane in the illumination beam path, such that the extent of the illumination radiation in the object can also be altered by means of the luminous field stop. By way of example, the luminous field stop is disposed downstream of the light source.

In order to increase the reproducibility of measurements with the aid of the microscope, it is preferred for the actual value to be monitored continuously, wherein, by means of the relationship, the actual value is converted and a deviation from the setpoint energy parameter is stored. In this way, it is possible, by way of the duration of the image recording of the object, to record the value of the energy parameter that is actually present on the object. The storage is effected in particular in the memory of the control device. Recording the value of the energy parameter that is actually present on the object makes it possible to identify deviations from the setpoint value in order to reject the recordings or results of the measurements for example in the case of excessively large deviations. This is used in particular if fluctuations of the energy parameter of the illumination radiation occur so rapidly or to such a great extent that readjustment by means of a regulating control loop is not sufficiently possible.

Since, preferably, no further optical imaging elements are provided between beam splitter device and objective, further parameters such as filters, pinholes or lenses and the transmission and/or reflection properties thereof need not be taken into consideration. Furthermore, the control device can have a detection device, which is used to ascertain the type or kind of the objective arranged in the imaging beam path, and knows indications about the transmission behavior of the respective objectives arranged in the imaging beam path.

It is preferred for an extent of a spot of the measurement radiation to be determined with the aid of a spatially resolving monitoring device and for the relationship to be corrected with regard to an effective aperture of the objective and the extent of the measured spot. With the aid of the spatially resolving monitoring device, it is possible to determine the area of the spot. If the area, e.g. the diameter, is smaller than the aperture of the objective, the intensity distribution and/or the shape and size of the illumination radiation can thus be determined. By way of example, a gaussian profile of the intensity of the illumination radiation can be measured with the aid of the spatially resolving monitoring device. The energy parameter of the illumination radiation that is present in the object can be determined more accurately with the aid of these results. The spatially resolving monitoring device comprises e.g. a CCD (charge-coupled device) sensor. If the extent of the illumination radiation is larger than the aperture of the objective, the proportion of the illumination radiation which is not transmitted by the objective can be taken into account in the relationship. By way of example, equation (1) is modified in the case of a locally constant intensity profile for a wide field imaging as follows:

$$LO = L \times T \times \left(\frac{1-A}{A}\right) \times k \times f \text{ where } k = \frac{OA^2}{DA^2} \leq 1 \qquad (2)$$

In this case, DA is the extent, e.g. the diameter, of the measurement radiation at the monitoring device and OA is the objective aperture. f indicates a correction factor, by means of which the influence of a luminous field stop is taken into account. The correction factor f can be determined empirically and is dependent, inter alia, on the shape of the opening in the luminous field stop. Optionally, f=1 holds true. By way of example, the opening can be rectangular or round, wherein the former is employed precisely in the case of rectangular imaging detectors in order to achieve an appropriate overlap of an image field with the imaging detector. With the aid of determining the extent of the measurement radiation, that proportion of the illumination radiation which actually reaches the object can thus be ascertained more accurately. In this way, the intensity on the object can thus be set more precisely. The relationship does not apply to applications in which the illumination radiation is focused into the object in a point-type manner.

A further possibility for setting the energy parameter on the object more accurately is to generate an electronic image of the object by means of an imaging detector, wherein an exposure time of the imaging detector is synchronized with the exposure time of the monitoring device. Preferably, the control device is connected both to the imaging detector and to the monitoring device and can control or detect in particular the exposure times thereof. What can be achieved by the synchronization of the exposure times of the imaging detector and the monitoring device is that the value of the energy parameter on the object corresponds particularly well to the measured value. Precisely in the case of rapidly fluctuating light sources, this enables better monitoring of the energy parameter of the illumination radiation on the object.

In order to protect the object against radiation damage, for example the bleaching of fluorescent dyes in the object, it is preferred for a shutter to be provided between the objective and the beam splitter device, which shutter is only opened if the actual value assumes the desired setpoint value (within the tolerance range) after conversion taking account of the relationship. The shutter can be controlled by the control device, for example. The shutter remains closed as long as the ascertained value of the energy parameter of the illumination radiation on the object does not correspond to the setpoint value. By way of example, it is possible to wait for the light source to be heated up until it provides illumination radiation in a constant manner. The shutter is then opened in order to carry out the measurement. In this embodiment, provision can be made for carrying out the setting of the energy parameter of the illumination radiation on the object only until the shutter can be opened.

The shutter is optionally also employed in the case of optical manipulation experiments such as FRAP or FLIP, Laser Ablation or optical tweezers. Here the illumination device is in some instances also used for imaging. In the case of optical manipulation experiments, the illumination radiation has a significantly higher power. This means that e.g. the illumination device effects bleaching, and the object is imaged in order to document the fluorescence. These experiments sometimes proceed with two different wavelengths, which are then used simultaneously; one wavelength range for bleaching and the other wavelength range for imaging. In order to avoid undesired bleaching before the energy parameter has the correct value or assumes the latter in a constant manner, the shutter can optionally be used dichroically, i.e. for blocking (only) the illumination radiation.

In order to increase the reproducibility of measurements and to accurately determine the parameters of the measurement with the aid of the microscope, it is preferred that a temporal profile of the setpoint value of the energy parameter on the object and/or of the actual value of the energy parameter of the measurement radiation or of variables calculated therefrom, e.g. of that value of the energy parameter on the object which is determined from the relationship, is stored. These data can be stored for example with the recording of the object. This has the advantage that the accurate parameters of the recording of the object are known and the measurement can therefore be reproduced, if appropriate.

The microscopy method can be used both for fluorescence microscopy and for laser-based techniques, in particular in the wide field. Furthermore, it is possible to employ the method in the case of illumination radiation that effects optical manipulation techniques, such as FRAP (Fluorescence Recovery after Photobleaching) or FLIP (Fluorescence Loss in Photobleaching). Moreover, the method can use different wavelengths to illuminate and/or image and/or process the object, e.g. by means of laser ablation. The microscope used can be a confocal microscope or a microscope for imaging the object in the wide field. Preferably, the microscopy method is designed to stimulate emission of fluorescent light in the object and to detect the fluorescent light emitted by the object. For this purpose, the object can be provided with fluorescent dyes, for example. The object can be regarded as any sample, body or structure which is intended to be imaged with the aid of the microscope. In particular, the object can comprise a biological sample.

The objective focuses the illumination radiation into the object and, in the case of reflected light microscopy, simultaneously serves for imaging the object, i.e. for detecting the radiation generated or reflected by/at the object. An image of the object is generated with the aid of the imaging beam path, at the end of which there is an image detector for converting the radiation guided by the imaging beam path into electrical signals. A control device can convert the electrical signals into an electronic image of the object, for example, which is e.g. represented on a display device and/or stored.

The control device optionally has a memory, in which the relationship between the energy parameter of the measurement radiation and the energy parameter of the illumination radiation on the object is stored. The control device controls the light source for this purpose in such a way that the energy parameter of the illumination radiation generated by the light source has the predefined setpoint value within a tolerance range. The relationship can furthermore be influenced by that proportion of the illumination radiation which is absorbed or reflected by the objective and/or that proportion of the illumination radiation which is transmitted by the objective as parameters, e.g. in the form of a transmittance. This value may be known for the respective objective or be determined before the actual measurement of the object. In particular, this value is stored in a wavelength-dependent manner in the memory; the relationship can be wavelength-dependent. Furthermore, the proportion which is coupled out from the illumination radiation as measurement radiation is stored in the memory of the control device. This proportion, too, may be previously known or determined before the actual measurement by calibration.

In order to reduce the size of the construction and to reduce the structural complexity for the microscope, it is preferred for a monitoring optical unit to be disposed downstream of the beam splitter, which monitoring optical unit focuses the measurement radiation onto the monitoring device, wherein the monitoring device preferably has a non-spatially resolving detector, such as a photodiode, for example. Together with the monitoring stop, it is then possible to use a non-spatially resolving detector and nevertheless to take account of the diameter of the illumination radiation or the effective aperture. Since the construction of non-spatially resolving detectors is usually smaller than spatially resolving detectors and moreover simpler, structural space and also complexity can thus be saved.

All the parameters mentioned and also the immersion medium present between the objective and the object influence the energy parameter of the illumination radiation in the object. By virtue of knowledge of one, a plurality or all of these parameters, the relationship can be modified such that it provides a more accurate link between the energy parameter of the measurement radiation and the energy parameter of the illumination radiation in the object. The parameters mentioned can therefore influence the relationship as variables.

The beam splitter device for coupling out the measurement radiation onto the monitoring device is arranged in the joint beam path near to the objective, such that the measurement radiation coupled out by the beam splitter device is very exact in the relationship around the energy parameter of the illumination radiation which is focused onto the object by the objective. In particular, therefore, by means of the monitoring device, all those alterations of the energy parameter of the illumination radiation which are caused by previously traversed filters, optical elements or other effects are detected by the monitoring device. In this way, on account of the beam splitter device at the objective, the monitoring device detects a signal that corresponds particularly precisely to the energy parameter of the illumination radiation in the object itself. In particular, it is not necessary to take account of the effects of inserted filters, lenses or beam splitters by calculations or other considerations, since the measurement radiation is coupled out from the imaging beam path only when the illumination radiation has passed through these elements, etc. At the same time, it is possible to determine the energy parameter of the illumination radiation also during the examination of the object. This allows, in particular, a regulation of the light source toward a constant energy parameter of the illumination radiation in the object. This reduces user interaction, as a result of which experiments are simplified. The measurement data obtained with regard to the illumination of the object can be linked with the recorded images, such that it is possible to obtain a particularly precise documentation with regard to the illumination conditions.

It goes without saying that the aforementioned features and those yet to be explained below can be used not only in the combinations specified but also in other combinations or on their own, without departing from the scope of the present invention.

BRIEF DESCRIPTION OF THE DRAWINGS

The invention is explained in even greater detail below for example with reference to the accompanying drawings, which also disclose features essential to the invention. In the figures.

DETAILED DESCRIPTION

Figure 1:
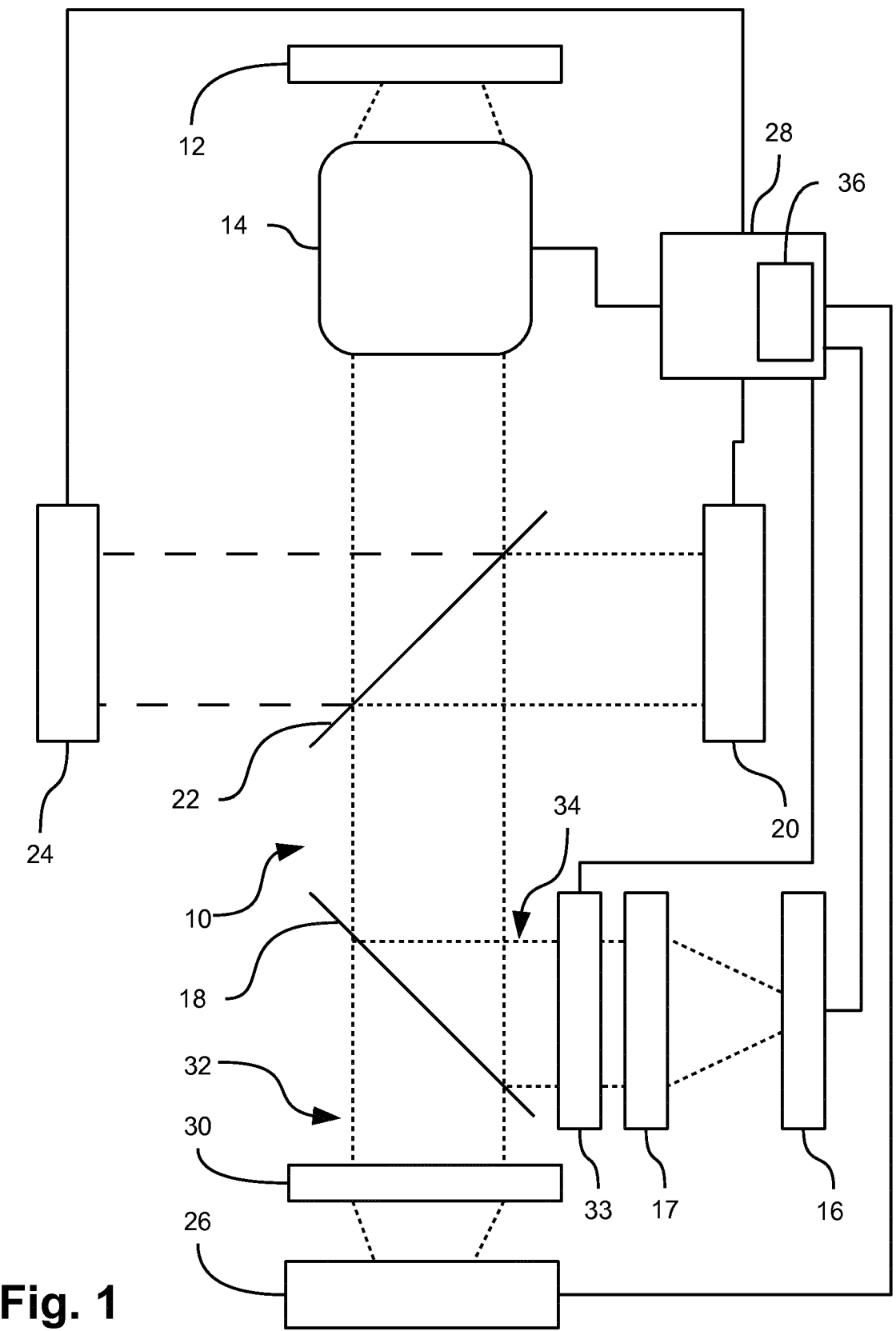
FIG. 1 shows a schematic illustration of a first embodiment of a microscope used for a microscopy method.

A reflected light microscope 10 in accordance with the embodiment shown in FIG. 1 serves for imaging an object 12, in particular in the wide field. The object 12 may contain fluorescent dyes or substances that emit radiation after stimulation. The microscope 10 comprises an objective 14, a light source 16, an optical element 18, a monitoring device 20, a beam splitter device 22, an autofocus device 24, an imaging detector 26 and a control device 28.

The objective 14, the beam splitter device 22, the optical element 18 and a lens element 30 and also the imaging detector 26 form an imaging beam path 32. The light source 16, the optical element 18, the beam splitter device 22 and the objective 14 form an illumination beam path 34. The imaging beam path 32 and the illumination beam path 34 pass between the objective 14 and the optical element 18 in a joint beam path.

The objective 14 therefore serves both for focusing the illumination radiation of the illumination beam path 34 onto the object 12 and for imaging the object 12 through the imaging beam path 32. The object 12 is imaged onto the imaging detector 26 by the objective 14 and the lens element 30. The lens element 30 can also be regarded as a tube lens. Between the objective 14 and the lens element 30 there is an infinity space. The beam splitter device 18 is thus arranged in the infinity space of the imaging beam path 32. The imaging detector 26 converts the radiation incident on it into electrical signals, which are communicated to the control device 28 e.g. by means of a line. The control device 28 generates from the electrical signals an image of the object 12, which can be represented on a display device (not illustrated). The image of the object 12 can be a fluorescence image, for example.

The light source 16 can be embodied as a laser, a light-emitting diode (LED) or as a white light source. The light source 16 can preferably generate parallelized illumination radiation; in the embodiment shown in FIGS. 1 and 2, the light source emits non-parallelized illumination radiation, which is parallelized by a lens 17. Depending on the type of experiment carried out, the illumination radiation is guided in a parallelized manner or convergently in the illumination beam path 34.

Via the optical element 18, which is embodied for example as a dichroic mirror, the illumination radiation is coupled into the imaging beam path 32. The illumination radiation comprises e.g. a wavelength range that serves for stimulating fluorescent radiation in the object 12. The radiation emitted by the object 12 in general preferably has a different wavelength range than the wavelength range of the illumination radiation, such that the optical element 18 in general is dichroic and acts only on the illumination radiation.

An excitation filter 33 is provided between the light source 16 and the beam splitter device 18. Said excitation filter can be inserted into the illumination beam path 34, for example by means of a turret or slide. The control device 28 is designed to ascertain the type of the excitation filter 33 and thus the wavelength range transmitted by the excitation filter 33. Furthermore, the type of the excitation filter 33 can also be input manually, such that the wavelength range of the illumination radiation that is transmitted by the excitation filter 33 is known to the control device.

With the aid of the beam splitter device 22, which can be embodied e.g. as a beam splitter, measurement radiation is separated from the illumination radiation from the joint beam path, in particular in a wavelength-independent manner, and is fed to the monitoring device 20. By way of example, 10%, 5% or 1% of the intensity or the power of the illumination radiation can be separated as measurement radiation. In the embodiment of the microscope 10 presented in FIG. 1, the monitoring device 20 is embodied as a spatially resolving detector, such as e.g. a CCD (charge-coupled device) sensor, which converts the radiation incident on it into electrical signals in a spatially resolving manner. The electrical signals generated by the monitoring device 20 are conducted to the control device 28 by a line. The electrical signals generated by the monitoring device 20 are in particular proportional to the intensity or power of the radiation incident on the monitoring device 20, such that the control device 28 can determine from the signals the intensity of the measurement radiation that is incident on the monitoring device 20. The intensity is one example of the energy parameter; hereinafter the invention is discussed with reference to the intensity as energy parameter, but is not restricted thereto.

Preferably, the control device 28 has a memory 36, in which that percentage of the illumination radiation which the beam splitter device 22 couples out from the joint beam path onto the monitoring device 20 is stored in a wavelength-dependent manner. The memory 36 may be for example a writable or non-writable memory medium such as a RAM or ROM. On the basis of the intensity of the measurement radiation that is detected by the monitoring device 20, the control device 28 can ascertain the intensity of the illumination radiation that is made available by the light source 16. What is far more important, however, is that the control device 28 ascertains the intensity of the illumination radiation in the object 12. For this purpose, the control device 28 can be connected to the objective 14, in order for example to detect what kind or type of objective 14 is currently provided in the joint beam path. By way of example, a plurality of objectives 14 can be arranged on a turret and the control device 28 can detect which of the objectives 14 is currently situated in the joint beam path.

A relationship is stored in the memory 36, which relationship preferably indicates the transmission and/or reflection behavior of the objective 14 in a wavelength-dependent manner. Furthermore, the aperture of the objectives 14 used in the microscope 10 is also stored. On the basis of the transmission and/or reflection properties of the objective 14 and the knowledge of the intensity of the illumination radiation and also the wavelength range of the illumination radiation, which has been detected by the determination of the type of the light source 16 or of the excitation filter 33, the control device 28 can ascertain the intensity of the illumination radiation that is present in the object 12. By way of example, the intensity LO present in the object 12, the intensity L determined by the spatially resolving monitoring device 20, the proportion of the radiation A coupled out by the beam splitter device 22 and the transmittance of the objective 14 T are related by the following equation:

$$LO = l \times T \times \left(\frac{1-A}{A}\right)$$

Since the monitoring device 20 has a spatially resolving detector, the control device 28 also determines a beam cross section of the measurement radiation and thus the intensity thereof. If the extent of the illumination radiation is larger than the aperture of the objective 14, not all of the illumination passes through the objective 14, and not all of the available illumination radiation is focused onto the object 12. With the aid of the spatially resolving monitoring device 20, therefore, when ascertaining the energy parameter of the illumination radiation in the object, the proportion of the unused illumination radiation can be taken into account since the aperture of the objective 14 is optionally stored in the memory 36.

The optional autofocus device 24 serves for detecting the position of the focus of the objective 14. The autofocus device 24 is configured for example as described in WO 2007/144197 A1. The autofocus device 24 generates autofocus illumination radiation, the wavelength range of which preferably does not correspond to the wavelength range of the illumination radiation or to the wavelength range of the fluorescent radiation generated by the object 12. The monitoring device 20 thus detects the position of the focus of the objective 14 from autofocus measurement radiation obtained from the object and communicates this indication to the control device 28. The control device 28 can then keep the focus of the objective 14 constant. Consequently, by driving the objective, it is possible to compensate for drift and other effects, for example.

On the objective side, the beam splitter device 22 is provided with a dichroic mirror that reflects the autofocus radiation and transmits the illumination radiation and also the fluorescent radiation. On the light source side, the beam splitter device 22 has the beam splitter for coupling out the measurement radiation. Optionally, the properties of the dichroic mirror and of the beam splitter can be realized in a single optical beam splitter layer. The beam splitter device 22 is preferably an integral element, having coatings that influence the reflection or transmission behavior thereof.

The joint beam path is free of optical elements between the objective 14 and the beam splitter device 22; no elements are provided in this region in the embodiment shown in FIG. 1. The radiation passes in a parallelized manner there.

Figure 2:
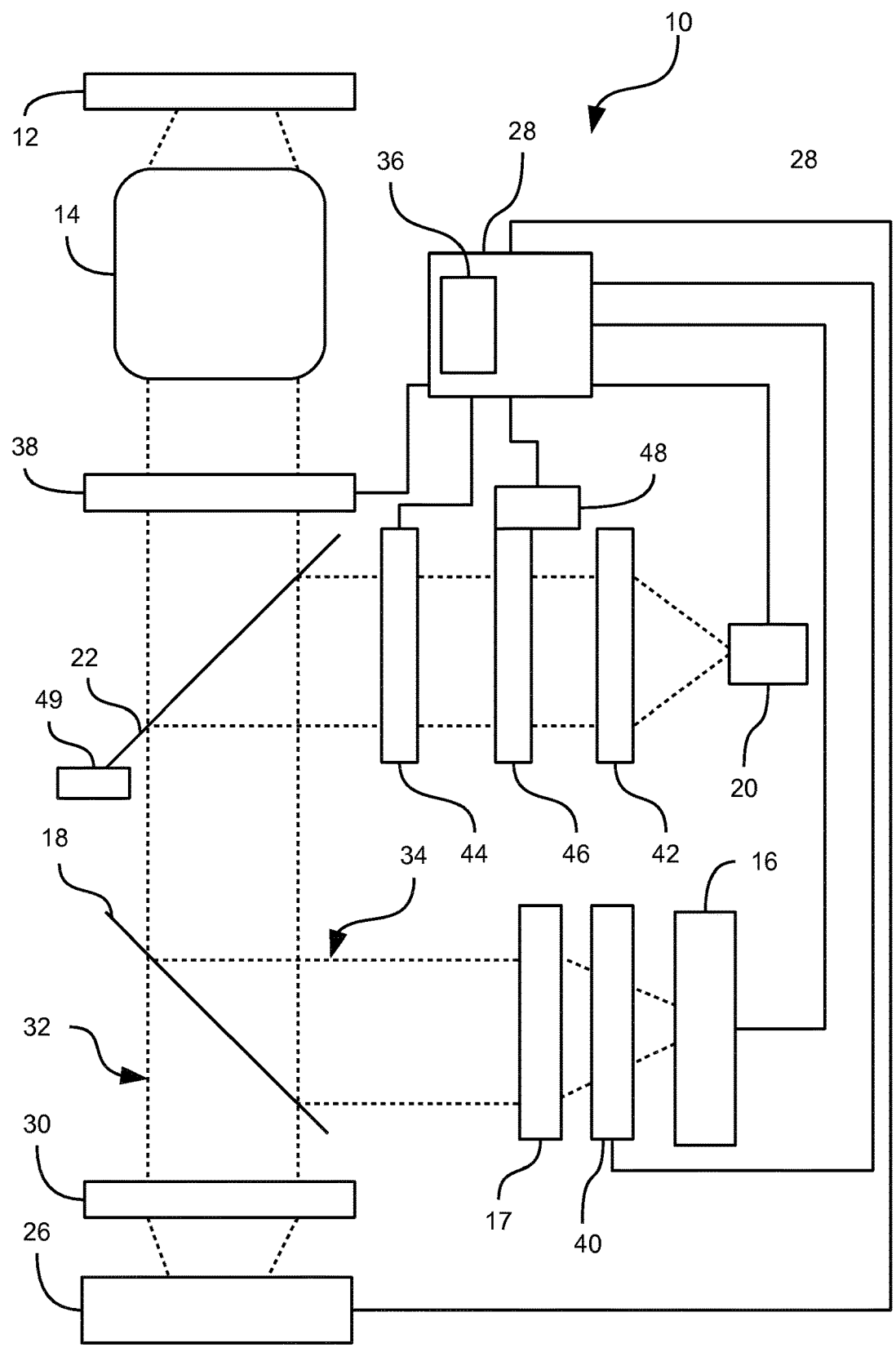
FIG. 2 shows a schematic illustration of a second embodiment of the microscope.

The embodiment of the microscope 10 as shown in FIG. 2 corresponds to the embodiment shown in FIG. 1 in terms of the basic construction. Even though the autofocus device 24 and the excitation filter 33 are not shown in FIG. 2, they can likewise be provided in FIG. 2. Only the other differences between the two embodiments in accordance with FIGS. 1 and 2 are discussed below:

In the illumination beam path 34, in the joint beam path in the case of the reflected light microscope, a provision is made of a shutter 38 between the objective 14 and the beam splitter device 22, and/or a luminous field stop 40. The shutter 38 is connected to the control device 28 via a line and is switchable into two operating states by the control device 28. In one operating state, the shutter 38 blocks the joint beam path, such that no illumination radiation can reach the object 12. In another operating state, the shutter 38 is open, and so the joint beam path is free.

As an option independent of the shutter, a luminous field stop 41 is arranged downstream of the light source 16, by means of which luminous field stop the field size of the illumination radiation can be altered. The luminous field stop 41 is connected to the control device 28 via a line, wherein the control device 28 can control and/or ascertain the position and/or size of the opening of the luminous field stop 41. In this way, it is possible to alter the cross section of the illumination radiation upstream of the joint beam path. The luminous field stop 40 is arranged in a plane that is conjugate with respect to an object plane; by way of example, the luminous field stop 40 is arranged between a light source lens 17 and the light source 16.

As a further independent option, the monitoring device 20 in the embodiment shown in FIG. 2 is embodied as a non-spatially resolving detector, for example a photodiode. The latter occupies less space and is simpler in its construction in comparison with the spatially resolving detector in accordance with FIG. 1. In order to focus the measurement radiation onto the monitoring device 20, a monitoring optical unit 42 is arranged between the beam splitter device 22 and the monitoring device 20. The monitoring optical unit 42 can comprise one or more lenses. The monitoring optical unit 42 focuses the measurement radiation that was coupled out from the parallelized illumination radiation onto the monitoring device 20.

Furthermore, an optional iris stop 44 and an optional filter 46 are arranged between the beam splitter device 22 and the monitoring device 20. The iris stop 44 is connected to the control device 28, as a result of which the control device 28 can alter and/or ascertain the size of an opening of the iris. In particular, the control device 28 drives the iris stop 44 in such a way that the opening thereof corresponds to the effective aperture of the objective 14. In this way, the cross section of the measurement radiation and the cross section of the illumination radiation that passes through the objective 14 have the same size. Consequently, the intensity of the illumination radiation present in the object 12 can be better ascertained. Optionally, as described above, the effective aperture of the objective 14 is ascertained from the type or kind of the objective 14 and also the size of the opening of the luminous field stop 41. The monitoring stop 44 is set according to the objective aperture, such that for different objectives 14, even with a larger illumination beam diameter, the transmitted proportion is always correspondingly guided onto the monitoring device.

The filter 46 can firstly be provided for attenuating the measurement radiation, in particular in a wavelength-independent manner, e.g. in order to avoid damage to the monitoring device 20 or in order to increase the measurement range of the monitoring device 20 with regard to the intensity. The filter 46 secondly can be configured in such a way that it blocks unwanted radiation that could corrupt the result of the measurement of the intensity of the illumination radiation. By way of example, radiation in the wavelength range of the autofocus radiation or of the fluorescent light is blocked. Furthermore, the filter 46 can be embodied as a bandpass filter, such that only radiation in that wavelength range which can be detected upstream of the monitoring device 20 is incident on the monitoring device 20. The microscope 10 can comprise one or more filters 46, as described above. In particular, the microscope 10 has a filter drive 48, by means of which the filter 46 can be changed or removed between the beam splitter device 22 and the monitoring device 20. In particular, the control device 28 controls the filter drive 48 in such a way that the filter 46 desired for the respective measurement is interposed between the beam splitter device 22 and the monitoring device 20.

The beam splitter device 22 can be formed from the joint beam path. For this purpose, a drive 49, e.g. an electric motor or a linear drive, can be provided. The drive 49 is data-technologically connected to the control device 28 via a line, not depicted in the figures, or by radio. As a result of removing the beam splitter device 22 from the joint beam path or the illumination beam path 34, the maximum intensity generated by the light source 16 is attained at the object 12 since no measurement radiation is coupled out in this case.

Figure 3:
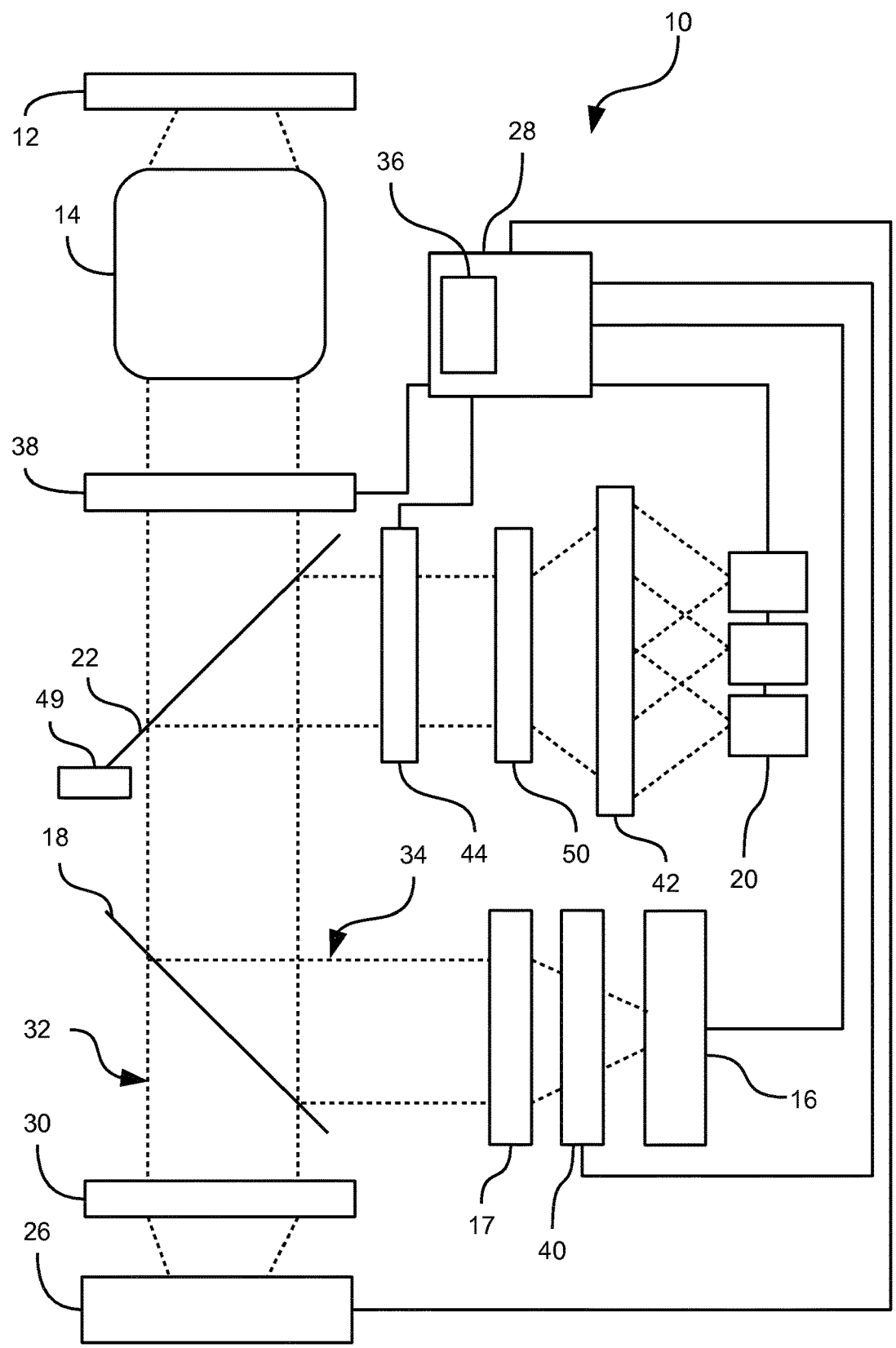
FIG. 3 shows a schematic illustration of a third embodiment of the microscope.

The embodiment of the microscope 10 as shown in FIG. 3 corresponds to the embodiment of the microscope 10 as shown in FIG. 2, apart from the provision of a spectral element 50 instead of the filter 46. However, it is also possible for both the filter 46 and the spectral element 50 to be provided between the monitoring device 20 and the beam splitter device 22. The spectral element 50 deflects the measurement radiation in a wavelength-dependent manner. By way of example, the spectral element 50 comprises a diffraction grating or a prism. Furthermore, the monitoring device 20 has a plurality of, in particular non-spatially resolving, detectors which can each detect incident radiation in a wavelength range. The radiation deflected by the spectral element 50 in a wavelength-dependent manner is focused onto the respective detectors of the monitoring device 20 with the aid of a monitoring optical unit 42. The monitoring device 20 is designed to effect spectrometric analysis in this way. This could also be done differently, e.g. using a spectrometer.

The control device 28 is designed to store the detected intensity of the illumination radiation continuously or at selected points in time in the memory 36 such that the intensity of the illumination radiation is specified for the images of the object 12 that are recorded by the microscope 10. In this way, measurements can be better documented and reproduced, if appropriate.

Figure 4:
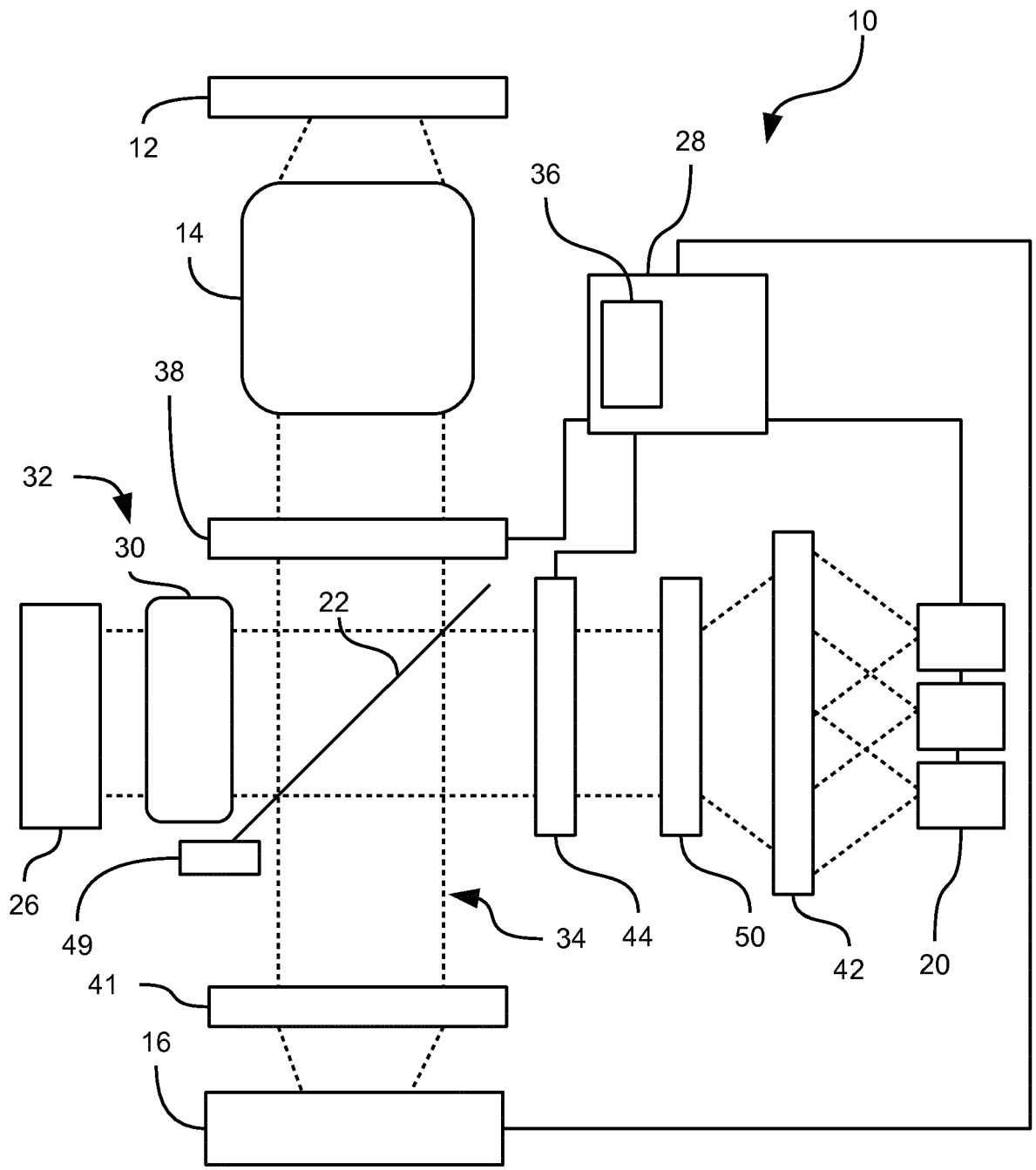
FIG. 4 shows a schematic illustration of a fourth embodiment of the microscope.

The embodiment of the microscope 10 as shown in FIG. 4 corresponds to the embodiment of the microscope 10 as shown in FIG. 3 apart from the difference that a transmitted light microscope is involved. In this embodiment, therefore, the illumination beam path 34 and the imaging beam path 32 are arranged on different sides of the object 12. The lens element 30 serves for imaging the object 12 onto the imaging detector 26. However, the construction shown in FIG. 4 can also be adapted to the embodiments of the illumination beam path 34 in accordance with FIGS. 1 and 2.

Figure 5:
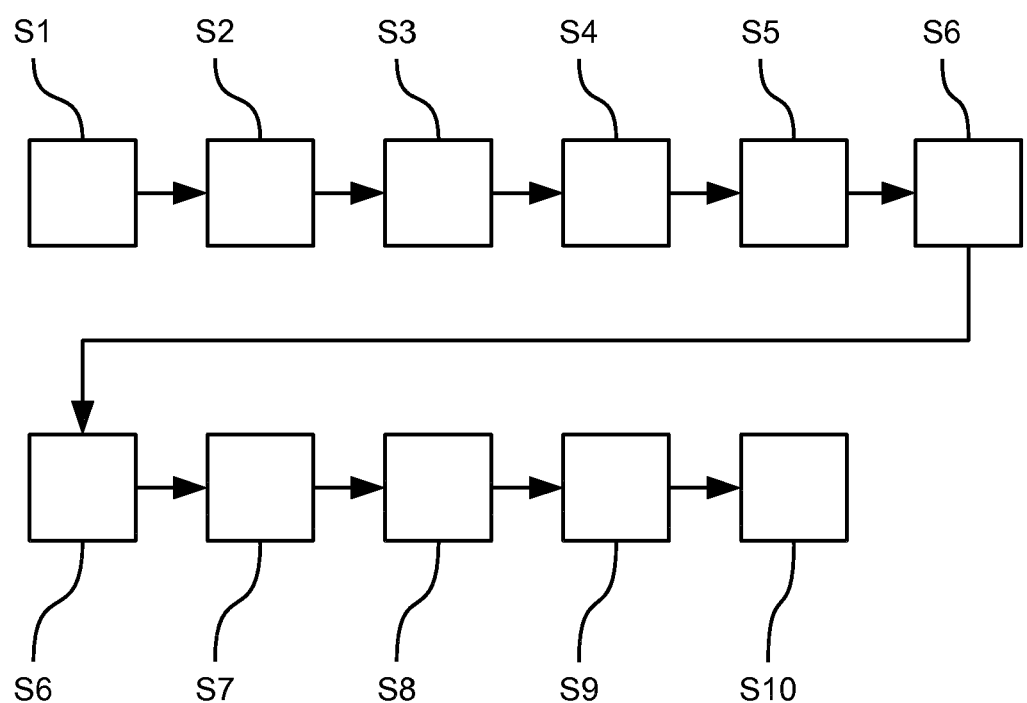
FIG. 5 shows a block diagram for illustrating a method for regulating an illumination in the microscopy method.

FIG. 5 shows a block diagram for illustrating the method. Step S1 involves defining a setpoint value of the intensity of the illumination radiation on the object 12. The setpoint value can be input manually by the user of the microscope 10 or be adopted automatically from measurements carried out previously. If data from measurements already carried out, such as the setpoint value, for example, are adopted, in an optional intermediate step it is possible to use the hardware components used in this experiment, such as the objective 14, the type of the light source 16, the excitation filter 33, the luminous field stop 40 and the like, and in particular with the corresponding settings. In an optional step S2, the shutter 38 is closed before the illumination radiation is emitted by the light source 16 in step S3. In step S4, with the aid of the beam splitter device 22, a proportion of the illumination radiation is coupled out as measurement radiation from the illumination beam path 34 onto the monitoring device 20. In step S4, an actual value of the intensity of the measurement radiation is ascertained, wherein this measurement is carried out in a wavelength-dependent manner, for example with the aid of the monitoring device 20 shown in FIGS. 3 and 4. An emission spectrum of the light source 16 is ascertained, for example read out from the memory 36, and/or a wavelength range transmitted by the excitation filter 33 is ascertained. On the basis of the intensities at the measured wavelengths, the total intensity of the illumination radiation is calculated with the aid of the known emission spectrum. The exposure time of the monitoring device 20 is optionally synchronized with the exposure time of the imaging detector 26, thereby minimizing deviations between the detected intensity and the intensity actually present on the object 12 on account of fluctuations of the light source 16.

Step S5 involves taking account of the transmission property of the objective 14 and optionally the transmission property of the optical imaging elements arranged between the beam splitter device 22 and the objective 14, such as, for example, a pinhole, and/or the immersion medium present between the object 12 and the objective 14. Detecting the transmission properties, e.g. as transmittance, is carried out in a wavelength-dependent manner, in particular.

Step S6 involves establishing a relationship between the intensity of the measurement radiation and the intensity of the illumination radiation on the object 12 from the transmission properties of the objective 14 and, if appropriate, the optical elements that the illumination radiation passes through after the output coupling. This is influenced by the magnitude of the proportion, e.g. as a percentage value. The relationship can optionally take account of optical imaging elements arranged between the objective 14 and the beam splitter device 22 and/or an immersion medium present between the object 12 and the objective 14. One possible relationship is e.g. the equation described above. The relationship can also be established in a wavelength-dependent manner.

An optional step S7 involves setting the monitoring stop 44 depending on the focal length and the distance between the object 12 and the objective 14 in particular from the extent—ascertained therefrom—of the illumination radiation on the object 12 such that the area of the measurement radiation on the monitoring device 20 corresponds to the area of the illumination radiation on the object 12.

In step S8, the actual value, the setpoint value and the actual intensity calculated from the actual value are continuously monitored and stored in the memory 36. In step S9, the light source 16 is set in such a way that the actual intensity on the object as calculated from the actual value taking account of the relationship corresponds to the setpoint value of the intensity within the tolerance range, wherein this setting can be carried out by regulation. In an optional step S10, the shutter 38 is opened.

It is preferred for steps S4 to S9 to be carried out for all wavelength ranges used in the experiment, such that the intensity is set for all wavelength ranges before the shutter 38 is opened. Delays as a result of readjusting the intensities of individual wavelength ranges during the experiment can thus be avoided.

The invention claimed is:

1. A method for controlling or regulating a light source of a microscope for illuminating an object with illumination radiation, comprising the following steps:
   defining a setpoint value of an energy parameter of the illumination radiation on the object, wherein the setpoint value indicates with what intensity or power the object is intended to be illuminated;
   generating the illumination radiation by means of the light source;
   providing an objective for focusing the illumination radiation onto the object;
   coupling out a proportion of the illumination radiation upstream of the objective as measurement radiation and measuring an actual value of the energy parameter of the measurement radiation;
   ascertaining a transmission property of the objective for the illumination radiation by at least one of measuring the transmission property of the objective, reading the transmission property from a database for the objective and reading the transmission property from memory associated with the objective;
   providing a relationship between energy parameter of the measurement radiation and energy parameter of the illumination radiation on the object, wherein the relationship is dependent on the magnitude of the proportion and the transmission property of the objective; and
   setting the light source in such a way that the actual value of the energy parameter measured for the measurement radiation corresponds, within a tolerance range, to the setpoint value of the energy parameter of the illumination radiation on the object in accordance with the relationship; and
   wherein the microscope is configured to perform reflected light microscopy and further comprising performing the reflected light microscopy.

2. The method as claimed in claim 1, characterized in that ascertaining the transmission property and/or measuring the actual value are/is carried out in a wavelength-dependent manner and/or the relationship is wavelength-dependent.

3. The method as claimed in claim 1, characterized in that for taking account of the transmission property of the objective for the relationship, the type of the light source and/or an excitation filter, which filters the illumination radiation, are/is ascertained.

4. The method as claimed in claim 3, characterized in that the actual value of the energy parameter of the measurement radiation is measured in a predefined partial wavelength range of the illumination radiation, wherein an instantaneous value of the energy parameter on the object in the entire wavelength range is deduced from this indication taking account of the type of the light source and/or the excitation filter.

5. The method as claimed claim 1, characterized in that transmission properties of optical elements arranged between the objective and the output coupling location and/or transmission properties of an immersion medium present between the object and the objective are furthermore ascertained and taken into account for the relationship.

6. The method as claimed in claim 1, characterized in that the measurement radiation is guided through a monitoring stop, wherein an opening of the monitoring stop is set in such a way that it corresponds to an effective aperture of the objective.

7. The method as claimed in claim 1, characterized in that the actual value of the energy parameter of the measurement radiation is monitored continuously and the light source is regulated.

8. The method as claimed in claim 1, characterized in that an area of a spot of the measurement radiation is determined and the relationship is corrected with regard to an effective aperture of the objective (14) and/or the area.

9. The method as claimed in claim 1, characterized in that an electronic image of the object is generated, wherein an exposure time is synchronized with an exposure time of the process of measuring the actual value.

10. The method as claimed in claim 1, characterized in that a shutter is provided between the objective and a beam splitter device that couples out the measurement radiation, and the shutter is opened if the actual value corresponds to the setpoint value within the tolerance range.

11. The method as claimed in claim 1, characterized in that a temporal profile of the setpoint value and/or of the actual value of a value derived therefrom is stored.

* * * * *

UNITED STATES PATENT AND TRADEMARK OFFICE
CERTIFICATE OF CORRECTION

PATENT NO. : 11,774,739 B2
APPLICATION NO. : 16/463017
DATED : October 3, 2023
INVENTOR(S) : Michael Gögler et al.

It is certified that error appears in the above-identified patent and that said Letters Patent is hereby corrected as shown below:

On the Title Page

On page 2, under "FOREIGN PATENT DOCUMENTS", second Column, delete "CN 105974317 A 8/2016"

Signed and Sealed this
Twenty-sixth Day of December, 2023

Katherine Kelly Vidal
*Director of the United States Patent and Trademark Office*